United States Patent
Li et al.

(10) Patent No.: US 12,441,771 B2
(45) Date of Patent: Oct. 14, 2025

(54) METHOD FOR PURIFYING PEA ALBUMIN PA1a BY USING NEGATIVELY CHARGED POLYSACCHARIDE

(71) Applicant: JIANGNAN UNIVERSITY, Wuxi (CN)

(72) Inventors: Xingfei Li, Wuxi (CN); Yufei Hua, Wuxi (CN); Jie Long, Wuxi (CN); Caimeng Zhang, Wuxi (CN); Shunuan Yang, Wuxi (CN); Yeming Chen, Wuxi (CN); Xiangzhen Kong, Wuxi (CN)

(*) Notice: Subject to any disclaimer, the term of this patent is extended or adjusted under 35 U.S.C. 154(b) by 367 days.

(21) Appl. No.: 17/634,557

(22) PCT Filed: Jul. 14, 2021

(86) PCT No.: PCT/CN2021/106242
§ 371 (c)(1),
(2) Date: Feb. 11, 2022

(87) PCT Pub. No.: WO2022/028221
PCT Pub. Date: Feb. 10, 2022

(65) Prior Publication Data
US 2023/0151066 A1    May 18, 2023

(30) Foreign Application Priority Data
Aug. 4, 2020    (CN) .................. 202010771533.5

(51) Int. Cl.
*C07K 1/14*       (2006.01)
*C07K 14/415*    (2006.01)
(Continued)

(52) U.S. Cl.
CPC .............. *C07K 14/415* (2013.01); *C07K 1/14* (2013.01); *C07K 1/30* (2013.01)

(58) Field of Classification Search
CPC .................................................. C07K 14/415
(Continued)

(56) References Cited

U.S. PATENT DOCUMENTS

| 8,309,159 | B2 * | 11/2012 | Lotz ...................... A61Q 19/00 |
| | | | 426/656 |
| 2013/0274324 | A1 * | 10/2013 | Deng ...................... A23P 10/35 |
| | | | 530/370 |

FOREIGN PATENT DOCUMENTS

| CN | 103965352 A | 8/2014 |
| CN | 104530207 A | 4/2015 |

(Continued)

OTHER PUBLICATIONS

English Translation of CN110577565 published Dec. 17, 2019.*
ISR of PCT/CN2021/106242 of Oct. 13, 2021.

*Primary Examiner* — Vickie Y Kim
(74) *Attorney, Agent, or Firm* — Hemisphere Law, PLLC; Zhigang Ma

(57) ABSTRACT

Disclosed is a method for purifying pea albumin PA1a by using a negatively charged polysaccharide, which belongs to the field of protein extraction technology. According to the invention, with a natural edible negatively charged polysaccharide as a recycling material, based on the technical principle that the negatively charged polysaccharide preferentially binds to non-target proteins to precipitate and undergoes phase separation relative to the target protein, the separation and purification of pea albumin PA1a are realized to prepare pure PA1a. From the perspective of resource recycling, the invention can realize high value-added utilization of byproducts of pea protein isolate processing and prepare high-purity high-sulfur active protein components therefrom, thereby providing technical support for subsequent research. The invention features improved comprehensive utilization of pea whey, high recycle rate of PA1a (Continued)

protein with high purity, low requirements on equipment, simple and rapid operation and no environmental pollution.

7 Claims, 3 Drawing Sheets

(51) Int. Cl.
*C07K 1/30* (2006.01)
*C07K 1/32* (2006.01)

(58) Field of Classification Search
USPC .......................................................... 426/656
See application file for complete search history.

(56) References Cited

FOREIGN PATENT DOCUMENTS

| | | | |
|---|---|---|---|
| CN | 109566747 | * | 4/2019 |
| CN | 110577565 | A | 12/2019 |
| CN | 111875688 | A | 11/2020 |
| WO | 2009056689 | A1 | 5/2009 |

* cited by examiner

& # x 2 0;

METHOD FOR PURIFYING PEA ALBUMIN PA1a BY USING NEGATIVELY CHARGED POLYSACCHARIDE

FIELD OF TECHNOLOGY

The invention relates to a method for purifying pea albumin PA1a by using a negatively charged polysaccharide, which belongs to the field of protein extraction technology.

BACKGROUND

In recent years, plant proteins have attracted more and more attention, and people's dietary structure has gradually changed to sustainable plant ingredients. Among others, pea, as a sustainable crop, is not only a good source of starch products, but also a good source of protein products. Pea protein, as a hypoallergenic protein, is free of transgenic risks and has high nutritional value. In European and American countries and regions, pea protein milk beverage and fermented milk have attracted much attention and become increasingly important substitutes for cow milk protein beverage. In China, the utilization of pea protein is low, and is mostly concentrated on pea protein isolate, resulting in the waste of pea whey protein which accounts for 20%-30% of total pea proteins. Pea whey protein has a high sulfur content which accounts for more than two-third of the total pea sulfur-containing protein. As a result, the waste of pea whey protein not only causes a heavy loss of sulfur-containing protein, but also causes environmental problems due to large-scale discharge.

Pea whey is rich in a variety of 2S and 7S albumins, including PA2, PA1 and lectin, which all have various physiological activities. PA1 is one of the major pea 2S albumins, and its sulfur-containing amino acids account for about 50% of the total sulfur content in the seed. It consists of PA1a and PA1b, wherein PA1a has a molecular weight of about 6 kDa. PA1 has been proved to be a biologically active peptide of insect toxin toxic to a variety of insects. Currently, purification of PA1a is based on a method provided by John. A. GATEHOUSE through elution using Sephadex G-75 and DEAE-cellulose columns. The traditional chromatographic column separation method has a high selectivity, but its high cost and low separation speed make the separation and purification of PA1a highly costly. The polysaccharide/protein electrostatic interaction-driven complex coacervation method is rapid and efficient, can provide a large amount of purified PA1a at a low cost.

SUMMARY

An objective of the invention is to overcome the above defects and provide a rapid, efficient and low-cost method for purifying pea albumin PA1a by using a negatively charged polysaccharide.

The technical solution of the invention involves a method for purifying pea albumin PA1a by using a negatively charged polysaccharide, wherein to pea whey as a raw material, which is a pea protein and vermicelli wastewater processing byproduct, different types of negatively charged polysaccharide with a certain concentration as recycling materials are added in a certain mass ratio for selective complex coacervation; based on the principle that the negatively charged polysaccharide preferentially binds to non-target proteins to precipitate and undergoes phase separation relative to the target protein, PA2 and lectin in pea whey proteins are precipitated and removed by controlling the dosage of the polysaccharide and the pH of the solution to obtain a supernatant containing PA1a; by adjusting the pH, residual polysaccharide and small molecular substances are removed by ultrafiltration centrifugation to obtain a purified PA1a protein component which is then freeze-dried to obtain a pure pea albumin PA1a product with high purity.

The flow diagram of the invention is shown in FIG. 1, which includes the following specific steps:

(1) pretreatment of pea whey liquid: a pea whey liquid is adjusted to pH 4.0-5.0 with hydrochloric acid, and allowed to stand for 24-48 h at 4-10° C.; the resulting precipitate is removed by centrifugation, and the resulting supernatant is adjusted to pH 7.0-8.0 with an alkaline solution to obtain a pretreated pea whey liquid which is then measured for protein content;

(2) precipitation of PA2 and lectin in pea whey proteins by complex coacervation with negatively charged polysaccharide: a certain amount of solid polysaccharide sample powder is taken and prepared into a polysaccharide solution with a mass concentration of 0.1-0.6%; a corresponding volume of the polysaccharide solution is added into the pea whey liquid prepared in the step (1) in a mass ratio of protein to polysaccharide of 10-5:1, the resulting mixture is adjusted to pH of 3.5-4.6 with hydrochloric acid, stirred at room temperature for 15-30 min, and centrifuged at 4000-6000 rpm for 10-20 min; the resulting polysaccharide-PA2/lectin complex coacervate precipitate is removed; the residual supernatant is collected to obtain a roughly purified protein liquid enriched with PA1a;

(3) purification of PA1a albumin: the roughly purified protein liquid enriched with PA1a obtained in the step (2) is adjusted to pH of 7.0-8.0, subjected to ultrafiltration to remove the polysaccharide by using an ultrafiltration device with a molecular weight cut-off of 10-100 kDa, centrifuged at 3500-5000 rpm for 15-30 min, and repeatedly subjected to ultrafiltration for 1-2 times; the resulting permeate is collected and subjected to ultrafiltration concentration to remove small molecular substances by using an ultrafiltration device with a molecular weight cut-off of 1000-3500 Da, and the retentate is collected to obtain the purified PA1a protein liquid; and (4) freeze-drying of PA1a protein liquid: the PA1a protein liquid obtained in the step (3) is frozen at a temperature of −30° C. for 24-48 h, and the frozen sample is subjected to vacuum freeze-drying at a temperature of −40° C. to −60° C. under 5-10 Pa for 48-72 h to obtain the pea albumin PA1a.

Further, the pea whey liquid in the step (1) is derived from by-products of pea protein isolate processing and a supernatant of pea vermicelli wastewater after the pea protein isolate is precipitated, and has a protein content of 0.1-0.6% (w/v).

Further, the centrifugation in the step (1) is carried out at 4000-8000 rpm for 15-30 min.

Further, the negatively charged polysaccharide in the step (2) is specifically a sulfated polysaccharide and a carboxyl polysaccharide with a relative molecular weight of greater than 100 kDa, wherein the sulfated polysaccharide includes but is not limited to dextran sulfate, carrageenan (κ-, ι-, and λ-), chondroitin sulfate, fucoidan; and the carboxyl polysaccharide includes but is not limited to carboxymethyl cellulose, sodium alginate, xanthan gum, pectin.

Further, the negatively charged polysaccharide in the step (2) has a mass concentration consistent with that of protein in the pea whey liquid; if the mass concentration of the polysaccharide changes, the volume of the polysaccharide solution should be adjusted to ensure that the mass ratio of protein to polysaccharide in the final mixed solution remains unchanged.

Further, in the step (3), for the ultrafiltration to remove the polysaccharide by using an ultrafiltration device with a molecular weight cut-off of 10-100 kDa, an ultrafiltration membrane with a high molecular weight cut-off is preferred; and for the ultrafiltration concentration to remove small molecular substances by using an ultrafiltration device with a molecular weight cut-off of 1000-3500 Da, an ultrafiltration membrane with a low molecular weight cut-off is preferred.

Further, the pea albumin PA1a prepared in the step (4) is measured for sample purity by polyacrylamide gel electrophoresis SDS-PAGE and gel filtration-high performance liquid chromatography SEC-HPLC, measured for protein content by the BCA method, measured for total sugar content by the phenol sulfuric acid method GB/T 15672-2009, measured for moisture by the drying method GB/T 5497-1985, and measured for ash content by the loss-on-ignition method.

In the invention, since the isoelectric point of the pea whey protein is primarily at about pH 4.5-4.8, when the pH of the mixed solution of the pea whey protein and the polysaccharide is adjusted to below the isoelectric point of the protein, the polysaccharide with negative charge can interact with the pea whey protein with positive charge through electrostatic attraction to form insoluble complex coacervate, and the insoluble coacervates can be separated through centrifugation. Therefore, according to the invention, by controlling the conditions of complex coacervation between pea whey protein and the negatively charged polysaccharide, all the PA2 and lectin form insoluble complex coacervates with the negatively charged polysaccharide and precipitate through centrifugation, so that only the target pea albumin PA1a remains in the supernatant.

The invention provides a single purified PA1a protein using a natural edible negatively charged polysaccharide as a raw material for recovering and purifying the protein based on the principle that non-target proteins (PA2 and lectin) and polysaccharide form complex coacervate precipitate when they carry opposite charges, while the target protein PA1a does not participate in the formation of the complex coacervates. In addition, the prepared complex coacervates can be directly used as a food material. From the perspective of resource recycling, the invention not only can prepare a high-purity pea albumin component (PA1a) with low loss and high selectivity, but also can recycle other protein components in the pea whey to provide technical support for subsequent development and research.

Beneficial effects of the invention: the invention has simple operation procedure, low requirements on equipment and is easy to realize large-scale production; the polysaccharide is used in small amounts and can be recycled through membrane separation; the purified and recycled PA1a protein has a purity of more than 90% and a recovery rate of more than 80%, and still retains its natural activity.

BRIEF DESCRIPTION OF THE DRAWINGS

FIG. 1. Process flow diagram for separation and purification of PA1a.

Figure 1:
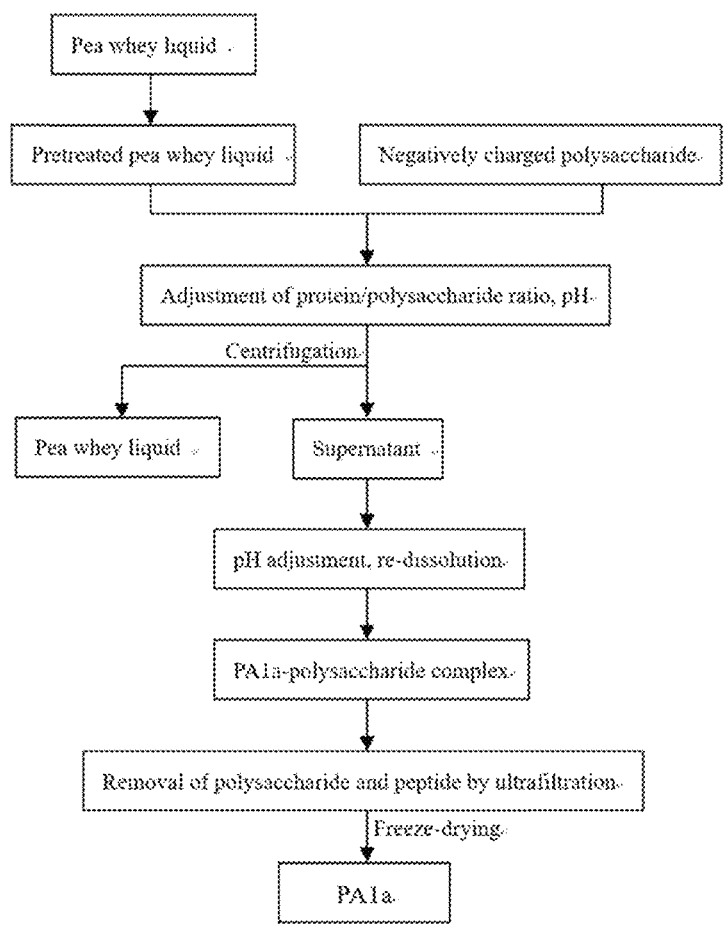

Reference numerals: lane 1 represents marker; lane 2 represents purified PA1a; lane 3 represents pea whey protein.

DESCRIPTION OF THE EMBODIMENTS

Example 1

(1) Pretreatment of pea whey liquid: a pea whey liquid was adjusted to pH of 4.5 with 2 mol/L hydrochloric acid, allowed to stand at 4° C. for 48 h, and centrifuged at 8000 rpm for 20 min to remove the precipitate; the resulting supernatant was adjusted to pH of 7.0 with 1 mol/L NaOH solution to obtain the pretreated pea whey liquid.

(2) Precipitation of PA2 and lectin in pea whey proteins by complex coacervation with negatively charged polysaccharide: 400 mg of carboxymethyl cellulose powder (molecular weight 250 kDa) was weighed and dissolved in 100 mL of deionized water with magnetic stirring for 2 h for complete dissolution. 20% (v/v) carboxymethyl cellulose solution was added into the pea whey liquid, and well mixed. The mixture was adjusted to pH of 4.12, magnetically stirred for 15 min, and centrifuged (4000 rpm, 20 min) to remove the complex coacervate precipitate, and the supernatant was collected to obtain a crude protein extract of PA1a and carboxymethyl cellulose.

(3) Purification of PA1a pea albumin: the above solution was adjusted to pH of 7.0, which was followed by ultrafiltration (MWCO 100 kDa) centrifugation for 30 min to remove the polysaccharide, and the ultrafiltration was repeated once; the permeates were combined, and subjected to ultrafiltration centrifugation with a molecular weight cut-off of 3500 Da for 30 min to remove small molecular substances, and the retentate was collected to obtain the purified PA1a protein liquid.

(4) Freeze-drying of PA1a protein liquid: the above purified protein liquid was frozen at −30° C. for 48 h, and then freeze-dried at −60° C. and 5 Pa for 48 h to obtain the pea albumin PA1a.

The protein content of the prepared PA1a was determined, and the protein purity was detected by SEC-HPLC and analyzed by SDS-PAGE electrophoresis.

Figure 2:
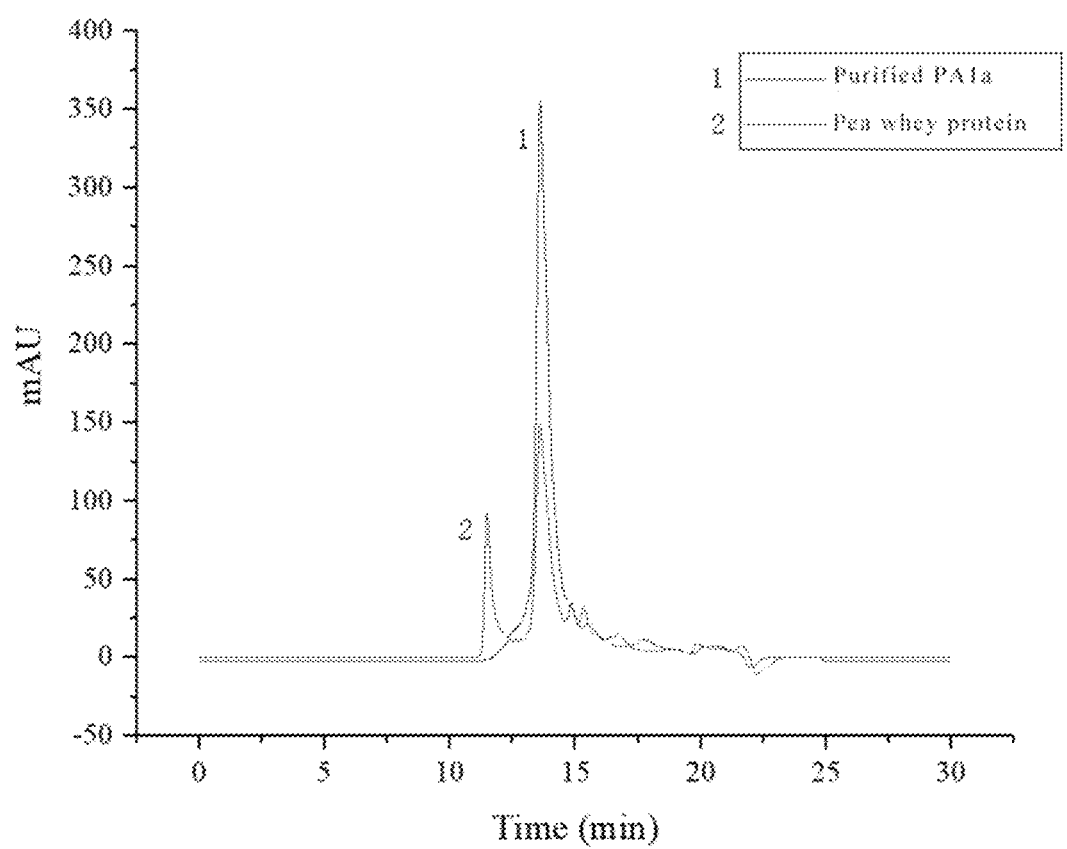
FIG. 2. SEC-HPLC chromatogram for detection of purity of PA1a protein.

The SEC-HPLC chromatogram for detection of protein purity of PA1a is shown in FIG. 2, and it can be seen that the protein purity of PA1a is 93.82%.

Figure 3:
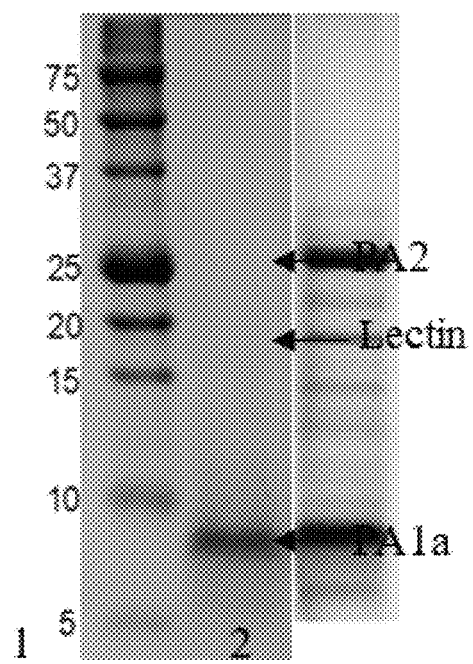
FIG. 3. SDS-PAGE image for detection of purity of PA1a protein.

The SDS-PAGE image for detection of protein purity of PA1a is shown in FIG. 3, and it can be seen that the protein purity of PA1a is about 97.25%.

As detected, the PA1a obtained in the above example has, on a dry basis, a protein content of about 92.68%, a total sugar of 2.3%, and an ash content of 4.85%.

Example 2

(1) Pretreatment of pea whey liquid: a pea whey liquid was adjusted to pH of 4.6, allowed to stand at 4° C. for 24 h, and centrifuged at 4000 rpm for 30 min to remove the precipitate; the resulting supernatant was adjusted to pH of 7.5 with 1 mol/L NaOH solution to obtain the pretreated pea whey liquid.

(2) Precipitation of PA2 and lectin in pea whey proteins by complex coacervation with negatively charged polysaccharide: 450 mg of dextran sulfate powder (molecular weight 500 kDa) was weighed and dissolved in 100 mL of deionized water with magnetic stirring for 1 h for complete dissolution. 10% (v/v) dextran sulfate solution was added into the pea whey liquid, and well mixed. The mixture was adjusted to pH of 4.60, magnetically stirred for 25 min, and centrifuged (6000 rpm, 15 min) to remove the complex coacervate precipitate, and the supernatant was collected to obtain a crude protein extract of PA1a and dextran sulfate.

(3) Purification of PA1a pea albumin: the above solution was adjusted to pH of 7.5, which was followed by ultrafiltration (MWCO 50 kDa) centrifugation for 20 min to remove the polysaccharide, and the ultrafiltration was repeated for two times; the permeates were combined, and subjected to ultrafiltration centrifugation with a molecular weight cut-off of 1000 Da for 25 min to remove small molecular substances, and the retentate was collected to obtain the purified PA1a protein liquid.

(4) Freeze-drying of PA1a protein liquid: the above purified protein liquid was frozen at −30° C. for 24 h, and then freeze-dried at −50° C. and 10 Pa for 36 h to obtain the pea albumin PA1a.

The protein content of the prepared PA1a was determined, and the protein purity was detected by SEC-HPLC and analyzed by SDS-PAGE electrophoresis.

As detected, the PA1a obtained in the above example has, on a dry basis, a protein content of about 90.81%, a total sugar of 4.22%, and an ash content of 4.57%.

Example 3

(1) Pretreatment of pea whey liquid: a pea whey liquid was adjusted to pH of 4.8, allowed to stand at 4° C. for 48 h, and centrifuged at 6000 rpm for 15 min to remove the precipitate; the resulting supernatant was adjusted to pH of 7.0 with I mol/L NaOH solution to obtain the pretreated pea whey liquid.

(2) Precipitation of PA2 and lectin in pea whey proteins by complex coacervation with negatively charged polysaccharide: 500 mg of sodium alginate powder (molecular weight 390 kDa) was weighed and dissolved in 100 mL of deionized water with magnetic stirring for 2 h for complete dissolution. 20% (v/v) sodium alginate solution was added into the pea whey liquid, and well mixed. The mixture was adjusted to pH of 3.9, magnetically stirred for 30 min, and centrifuged (4000 rpm, 20 min) to remove the complex coacervate precipitate, and the supernatant was collected to obtain a crude protein extract of PA1a and sodium alginate.

(3) Purification of PA1a pea albumin: the above solution was adjusted to pH of 8.0, which was followed by ultrafiltration (MWCO 100 kDa) centrifugation for 25 min to remove the polysaccharide, and the ultrafiltration was repeated once; the permeates were combined, and subjected to ultrafiltration centrifugation with a molecular weight cut-off of 3500 Da for 20 min to remove small molecular substances, and the retentate was collected to obtain the purified PA1a protein liquid.

(4) Freeze-drying of PA1a protein liquid: the above purified protein liquid was frozen at −30° C. for 36 h, and then freeze-dried at −60° C. and 10 Pa for 60 h to obtain the pea albumin PA1a.

The protein content of the prepared PA1a was determined, and the protein purity was detected by SEC-HPLC and analyzed by SDS-PAGE electrophoresis.

As detected, the PA1a obtained in the above example has, on a dry basis, a protein content of about 91.75%, a total sugar of 3.65%, and an ash content of 4.32%.

Due to difference in molecular weight size and homogeneity between the three negatively charged polysaccharides used in the examples, there is difference in residual total sugar and protein content of the resulting PA1a.

What is claimed is:

1. A method for purifying pea albumin PA1a by using a negatively charged polysaccharide, said method comprising combining pea whey as a raw material and a natural edible negatively charged polysaccharide as a recycling material, said pea whey having PA1a as a targeted protein; said negatively charged polysaccharide preferentially binds to non-target proteins of said pea whey and is precipitated under complex coacervation conditions to obtain a polysaccharide-PA2/lectin complex coacervate precipitate and removed from the pea whey; and, from the remaining pea whey, the targeted protein, pea albumin PA1a is purified.

2. The method for purifying pea albumin PA1a using a negatively charged polysaccharide according to claim 1, wherein the method comprises steps of:

step 1: pretreatment of said pea whey: a pea whey as a raw material is adjusted to pH of 4.0-5.0 with hydrochloric acid, and allowed to stand for 24-48 h at 4-10° C.; the resulting precipitate is removed by centrifugation, the resulting supernatant is adjusted to pH of 7.0-8.0 with an alkaline solution to obtain pretreated said pea whey, and pretreated said pea whey is measured for protein content;

step 2: precipitation of PA2 and lectin in pea whey proteins by complex coacervation with the negatively charged polysaccharide: a certain amount of solid polysaccharide sample powder is taken and prepared into the negatively charged polysaccharide with a mass concentration of 0.1-0.6%; a corresponding volume of the negatively charged polysaccharide is added into pretreated said pea whey prepared in the step (1) in a mass ratio of protein to polysaccharide of 10-5:1, the resulting mixture is adjusted to pH of 3.5-4.6 with hydrochloric acid, stirred at room temperature for 15-30 min, centrifuged at 4000-6000 rpm for 10-20 min, and precipitated to obtain the polysaccharide-PA2/lectin complex coacervate precipitate, the remaining pea whey is collected to obtain a roughly purified protein liquid enriched with PA1a;

step 3: purification of pea albumin PA1a: the roughly purified protein liquid enriched with PA1a obtained in the step (2) is adjusted to pH of 7.0-8.0, subjected to ultrafiltration to remove the polysaccharide by using an ultrafiltration device with a molecular weight cut-off of 10-100 kDa, centrifuged at 3500-5000 rpm for 15-30 min, and then repeatedly subjected to ultrafiltration for 1-2 times; the resulting permeate is collected and subjected to ultrafiltration concentration to remove small molecular substances by using an ultrafiltration device with a molecular weight cut-off of 1000-3500 Da, and the retentate is collected to obtain the purified PA1a protein liquid; and step 4: freeze-drying of PA1a protein: the PA1a protein liquid obtained in the step (3) is frozen at a temperature of −30° C. for 24-48 h, and the frozen sample is subjected to vacuum freeze-drying at a temperature of −40° C. to −60° C. under 5-10 Pa for 48-72 h to obtain the PA1a pea albumin.

3. The method for purifying pea albumin PA1a by using a negatively charged polysaccharide according to claim 2, wherein the pea whey in the step (1) is derived from by-products of pea protein isolate processing and a supernatant of pea vermicelli wastewater after the pea protein isolate is precipitated, and has a protein content of 0.1-0.6% (w/v).

4. The method for purifying pea albumin PA1a by using a negatively charged polysaccharide according to claim 2, wherein the centrifugation in the step (1) is carried out at 4000-8000 rpm for 15-30 min.

5. The method for purifying pea albumin PA1a by using a negatively charged polysaccharide according to claim 2, wherein the negatively charged polysaccharide in the step (2) is specifically a sulfated polysaccharide or a carboxyl polysaccharide with a relative molecular weight of greater than 100 kDa.

6. The method for purifying pea albumin PA1a by using a negatively charged polysaccharide according to claim 5, wherein the sulfated polysaccharide includes but is not limited to dextran sulfate, carrageenan (κ-, ι-, and λ-), chondroitin sulfate or fucoidan; and the carboxyl polysaccharide includes but is not limited to carboxymethyl cellulose, sodium alginate, xanthan gum or pectin.

7. The method for purifying pea albumin PA1a by using a negatively charged polysaccharide according to claim 2, wherein the negatively charged polysaccharide in the step (2) has a mass concentration consistent with that of protein in pretreated said pea whey prepared in the step (1).

* * * * *